United States Patent [19]

Ruben

[11] Patent Number: 4,912,069

[45] Date of Patent: * Mar. 27, 1990

[54] USE OF PECTIN OR PECTIN-LIKE MATERIAL IN WATER-BASED CERAMICS

[76] Inventor: George C. Ruben, 10 Shaw St., Lebanon, N.H. 03766

[*] Notice: The portion of the term of this patent subsequent to Jul. 5, 2005 has been disclaimed.

[21] Appl. No.: 213,874

[22] Filed: Jun. 30, 1988

Related U.S. Application Data

[63] Continuation-in-part of Ser. No. 13,914, Feb. 12, 1987, Pat. No. 4,755,494, which is a continuation-in-part of Ser. No. 919,321, Oct. 14, 1986, abandoned.

[51] Int. Cl.$^4$ .................. C04B 33/04; C04B 33/13
[52] U.S. Cl. ........................................... 501/148
[58] Field of Search .............. 501/141, 145, 148, 81, 501/82, 146

[56] References Cited

U.S. PATENT DOCUMENTS

| | | |
|---|---|---|
| 722,791 | 3/1903 | Acheson . |
| 2,776,897 | 1/1957 | Hazelwood . |
| 4,022,633 | 5/1977 | Schneider . |
| 4,206,245 | 6/1980 | Drevici et al. . |
| 4,219,362 | 8/1980 | Colegrove . |
| 4,221,596 | 9/1980 | Rice ..................................... 264/63 |
| 4,318,996 | 3/1982 | Magder ............................... 264/42 |
| 4,333,863 | 6/1982 | Lindroth . |
| 4,452,905 | 6/1984 | Drinkuth et al. . |
| 4,520,129 | 5/1985 | Kennedy . |
| 4,755,494 | 7/1988 | Ruben . |

FOREIGN PATENT DOCUMENTS

| | | |
|---|---|---|
| 297942 | 1/1989 | European Pat. Off. . |
| 63-265848 | 11/1988 | Japan . |

OTHER PUBLICATIONS

Chemical Abstracts 103: 41455r.
Ries, H., *Clays*, John Wiley & Sons (NY) (1927) p. 174.
*Kirk-Othmer Encyclopedia of Chemical Technology*, vol. 12, 3rd ed., (Grayson and Eckroth, eds.) pp. 45-46 and 61, J. Wiley & Sons Inc., NY.
G. G. Hawley, *In: The Condensed Chemical Dictionary*, 10th ed., pp. 488, 780, 992-993 and 1075, Van Nostrand Reinhold Co., NY (1981).
L. S. O'Bannon, *In: The Dictionary of Ceramic Science and Engineering*, pp. 127 and 173, Plenum Press, NY (1984).

Primary Examiner—Brian E. Hearn
Assistant Examiner—Andrew Griffis
Attorney, Agent, or Firm—Hamilton, Brook, Smith & Reynolds

[57] ABSTRACT

The use of pectins or the pectin-like materials carboxymethylcellulose, alginic acid, tannins or orthodiphenolic compounds, as additives to clay to provide clay compositions of enhanced plasticity and stability is disclosed.

20 Claims, No Drawings

USE OF PECTIN OR PECTIN-LIKE MATERIAL IN WATER-BASED CERAMICS

RELATED APPLICATIONS

This application is a continuation-in-part of U.S. application Ser. No. 013,914, now U.S. Pat. No. 4,755,494 filed Feb. 12, 1987, which is a continuation-in-part of U.S. application Ser. No. 919,321 filed Oct. 14, 1986, now abandoned.

BACKGROUND OF THE INVENTION

With conventional clays, it is technically difficult to construct large structures and structures with substantial unsupported projections. Typically, the cohesion of clay compositions in the working phase and their ability to resist deformation is not sufficient to support such structures. Drying (i.e. air, bisque or high temperature firing) stress generally produces clay cracking and consequent loss of structural integrity. Where such structures are desired, internal scaffolding may be required but is generally insufficient for preventing these deformation or drying problems.

SUMMARY OF INVENTION

This invention pertains to the use of pectin or the pectin-like materials carboxymethylcellulose and alginic acid, and orthodiphenolic compounds as additives to heterogeneous clay compositions to produce cohesive, plastic, wet clay mixtures for the production of stoneware, earthenware, porcelain, new clay formulations and water polymerized glasses (i.e. sol gels). The clay mixtures of this invention handle as if homogeneous; they can be worked over a longer period of time; and they are plastic in their shaping properties but maintain their form after shaping and dry more uniformly (i.e. just as fast at the center as at the edges). The compositions comprise mixtures of clay and pectin or pectin-like material (together referred to as "pectic material"), the amount of pectic material being sufficient to enhance the controlled plasticity and dimensional stability of the clay when worked. The clay compositions are prepared by mixing the pectic material and clay. The pectic or pectic material is generally added to the clay before the water is added, or alternatively, it is mixed into the prescribed amount of water before the addition of the clay. The mixture of clay, pectin and water is blended thoroughly to provide clay which can be worked in normal fashion and thereafter fired. The pectin enhances the controlled plasticity and dimensional stability of the clay during working phases which allows for the production of large wheel thrown or large slab-constructed ceramic structures with substantial projections and extruded clay structures.

DETAILED DESCRIPTION OF THE INVENTION

The clay compositions of this invention are prepared by mixing a pectic material in desired proportion with a clay (e.g. potter's clay). More particularly, the clay compositions are clay mixtures containing additives such as alginic acid or a salt thereof (e.g., sodium alginate), carboxymethylcellulose or a salt thereof (e.g., sodium carboxymethylcellulose), tannins and orthodiphenolic compounds (e.g., gallic acid, pyrocatechol, pyrogallol); including combinations of these additives. The pectic material can be added to the clay before water is added; the pectic material and clay are mixed thoroughly, and subsequently, water is added and mixed thoroughly into pectic-containing clay composition. When particulates are added e.g. grog and mullite, a thorough mixing can be achieved by adding grog, mullite, and pectic material to the prescribed amount of water, mixing for about five minutes, and then mixing in the clay. The composition so formed can then be worked by conventional methods and subsequently fired. The firing achieves temperatures sufficient to incinerate the pectic material, which is only required for the working, dimensional stability (or deformation resistance) and drying phases, from the final ceramic.

Pectins are polysaccharide constituents of plant cell walls. Pectin consists largely of long chains of galacturonic acid units. Many forms of pectin and pectin-like materials are commercially available. The latter are long chain sugars in which carboxylic acid groups attached to some of the sugar residues and which form as 0.05–5% soluble solutions that gel in the presence of di- or tri-valent positive ions.

Suitable pectin-like materials are linear chains of sugars which have some chains branching and which contain long sequences (25 residues) with esterified or de-esterified carboxylic acid groups of at least four per 10 sugar residues. These materials are characterized by their solubility in water, easy de-esterification in basic solutions, and their ability for form gels as 0.1–2% solutions with di- or trivalent positive ions. Materials useful for forming the clay compositions of this invention include carboxymethylcellulose, alginic acid, tannins and orthodiphenolic compounds, and derivatives (e.g., salts) of these compounds.

Alginic acid is a hydrophilic, colloidal polysaccharide. Derivatives of alginic acid, for example, alginate salts can also be used in the present composition.

The alginic acid molecules can contain between about 50 to about 5000 sugar units. The carboxylic acid residues may range from being totally nonesterified to completely esterified. Preferred amounts of alginic acid or alginate salts in the present composition may range from about 0.5 to about 5.0% by weight in relation to the clay.

Carboxymethylcellulose compounds are also linear polysaccharides. Derivatives of carboxymethylcellulose, for example, salts thereof, (e.g., sodium carboxymethylcellulose) can also be used in the present composition. Preferred carboxymethylcellulose compounds comprise polysaccharide chains having a degree of substitution of about 9 to 12 carboxymethyl groups per ten glucose units and a degree of polymerization (DP) of about 40 to about 4,200 sugar units. Preferred amounts of carboxymethylcellulose or derivatives in the present composition may range from about 0.5 to about 5.0% by weight in relation to the clay.

All classes of tannins, or any compound containing orthohydroxyls on a phenolic ring may also be added to clays. Sources of tannins which can be used, for example, include querbracho, pecan shell or tannic acid. Compounds containing orthohydroxyls on a phenolic ring can include orthodiphenolic compounds, which include, for example, gallic acid, pyrocatechol or pyrogallol. Tannins or orthodiphenolic compounds are added to the clay in an aqueous solution. Preferred amounts of tannins or orthodiphenolic compounds in the present composition may range from about 1.0 to about 10% by weight in relation to the clay. The complexing of this compound to clays occurs in the pH range between about 3.0–11.0. A pH range between about 7.0–9.0 is preferred. Clay compositions containing tannins or orthodiphenolic compounds may also include particulate fillers such as grog or mullite. Tannins or orthodiphenolic compounds are mixed into the clay and allowed to react until the characteristic tannin or diphenol odor disappears, which generally occurs within one to eight weeks. The clay mixture is then dried, or used directly in a moist state. The addition of orthodiphenolic compounds improves the plasticity of clays. A clay composition containing tannin or orthodiphenolic compounds can then be combined with pectin, as described by G. Ruben in U.S. Pat. No. 4,755,494, or with alginates or carboxymethylcellulose, to obtain a clay composition which is more plastic than a composition containing pectin alone, but retains the advantageous properties conferred by the pectic material, i.e., dimensional stability and uniform drying. The pH range of the clay when pectin, or pectic material is added should be between about 1.0 and 9.0.

In order to extrude clay through a die to create long hollow cylinders, a more plastic clay mixture is needed than can be produced by just mixing the clay with pectin. Tannins and orthodiphenolic compounds make the clays more plastic but they must to be combined with the clay, then allowed to react over a period of one-eight weeks, since the odor of the unreacted tannin or orthodiphenolic compound must disappear before use of the clay mixture, or addition of pectin or pectic material. If the pectin, alginates or carboxymethylcellulose is added too soon, the tannins or diphenolic compounds will react with the above mentioned compounds forming a scum and producing an unuseable clay mixture. The fully reacted clay-tannin or clay-orthodiphenol mixture does not have the dimensional stability that the pectin or pectin materials confer, nor do they have the same drying properties. By adding pectin and pectic materials to the fully reacted clay-tannin or clay-orthodiphenol mixture, it is possible to extrude hollow cylinders through a die. These cylinders can be used for ceramic pipe or can be further shaped into other ceramic forms.

For preparation of the clay compositions of this invention, the pectic material is mixed with clay in proportions sufficient to confer enhanced plasticity and stability upon the clay for desired applications. Generally, the amount of pectic material is about 0.05–5.0 weight percent, preferably about 0.1–2 weight percent (pectic material to clay material). Pectins of various chain lengths can be used, generally ranging from 25–4400 sugar units (5,000–1,000,000 molecular weight). The pectins can be used in an esterified or non-esterified form, although tee de-esterified form is preferred. The amount of pectin and the kind of pectin which is optimal for a particular application can be determined in accordance with the working properties required.

Clays with pectin contents of approximately 2–5 weight percent pectin are less plastic and difficult to shape and/or to work their surface. A secondary surface application of 1–5 molar volatile acid (e.g. acetic acid, hydrochloric acid, formic) makes the clay more plastic during the working phases and regains its deformation resistance on partial drying.

The addition of pectic material provides a number of advantages. The pectin enhances the controlled plasticity while maintaining deformation resistance after shaping, increases cohesion of heterogeneous clay mixtures which attain working properties similar to homogeneous clays, and extends working time and uniform drying properties. The pectic material stabilizes the clay body during working phases. During air drying, moisture evaporation occurs evenly thus reducing cracking of the clay. Further, the pectin additives extend the period of workability and leaves unaffected the normal contraction characteristics of fired clay so that glaze formulations remain the same.

This combination of features makes possible the production of larger clay forms, the addition of more substantial projections to the forms and improved control over all stages of the production process.

This invention is further illustrated by the following examples:

EXAMPLE 1

Potter's clay is mixed thoroughly with pectin (USP L/200 Genu Pectin TM) at 0.1 weight percent of pectin to clay. After mixing, water is added, and the initial mixtures and the water are thoroughly mixed. The resulting mixture is worked in normal fashion and then fired.

EXAMPLE 2

In a clay mixture requiring particulates such as grog and mullite, the water is added to the mixer and 0.1–2 weight percent (USP L/200 Genu Pectin TM) pectin and the particulates are mixed for about five minutes before the clay is slowly added to the solution and thoroughly mixed. The resulting mixture is worked in normal fashion and then fired.

EXAMPLE 3

Porcelain clay mixtures, containing up to 15% white clays (grollege, EPK clay from Georgia) were mixed with 0.1–2 weight percent pectin (USP L/200 Genu Pectin TM). The compositions could be worked easily on a potter's wheel and they dried evenly without normal surface cracking over flat regions. About 28% overall final shrinkage was observed.

EQUIVALENTS

Those skilled in the art will recognize, or be able to ascertain using no more than routine experimentation, many equivalents to the specific embodiments of the invention described herein. Such equivalents are intended to be encompassed by the following claims.

I claim:

1. A clay composition consisting of a mixture of clay and alginic acid, or alginate salt, wherein the amount of alginic acid of alginate salt, is from about 0.5 to about 5.0 weight percent.

2. A clay composition of claim 1 wherein the alginic acid, or alginate salt, consists of a polysaccharide chain having from about 50 to about 5000 sugar units.

3. A clay composition of claim 2 wherein the alginic acid, or alginate salt, is partially or completely esterified.

4. A clay composition consisting of a mixture of clay and carboxymethylcellulose, or a salt thereof, wherein the amount of carboxymethylcellulose is from about 0.5 to about 5.0 weight percent.

5. A clay composition of claim 4 wherein the carboxymethylcellulose consists of a polysaccharide chain having a degree of substitution of from about 9 to about 12 carboxymethyl groups per ten glucose units.

6. A clay composition of claim 5 wherein the carboxymethylcellulose consists of a molecule having from about 40 to about 4,200 sugar units.

7. A clay composition comprising a mixture of clay and an orthodiphenolic compound, wherein the orthodiphenolic compound is added in an amount from about 1.0 to about 10.0 weight percent.

8. A clay composition comprising a mixture of clay, an orthodiphenolic compound and pectin or a pectic material.

9. A clay composition of claim 8 wherein the pectic material comprises carboxymethylcellulose or a salt thereof.

10. A clay composition of claim 8 wherein the pectic material comprises alginic acid or a salt thereof.

11. A clay composition of claim 8 wherein the clay mixture has a pH between about 3.0 to about 11.0.

12. A method of making a clay mixture, comprising the steps of:
   a. mixing clay with an orthodiphenolic compound, wherein the amount of orthodiphenolic compound is between about 0.5 to 10.0 weight percent;
   b. allowing the orthodiphenolic compound to react with the clay for a period of approximately one to eight weeks or longer, until the diphenol odor can no longer be detected in the clay mixture; and
   c. combining the mixture obtained after step (b) with about 0.5 to about 5.0 weight percent pectin, or pectic material.

13. A method of claim 12 wherein the pectic material is carboxymethylcellulose or a salt thereof.

14. A method of claim 12 wherein the pectic material is alginic acid or a salt thereof.

15. A method of claim 12 wherein the pH of the clay mixture during step (b) is between about 3.0 and 11.0.

16. A method of claim 12 wherein the pH of the clay during step (c) is between about 1.0 to 9.0.

17. A clay composition consisting of a mixture of clay, tannin and pectin or a pectic material.

18. A clay composition of claim 17, wherein the pectic material comprises carboxymethylcellulose, or a salt thereof.

19. A clay composition of claim 17 wherein the pectic material comprises alginic acid or a salt thereof.

20. A clay composition of claim 17 wherein the clay mixture has a pH of from about 3.0 to about 11.0.

* * * * *